March 21, 1961     E. F. COX     2,975,655

STEERING AND DRIVE MECHANISM

Filed July 31, 1957     2 Sheets-Sheet 1

EARLE F COX INVENTOR

BY Frost and Verhoeven

ATTORNEYS

EARLE F COX INVENTOR

BY Frost and Verhoeven
ATTORNEYS

United States Patent Office 2,975,655
Patented Mar. 21, 1961

2,975,655

STEERING AND DRIVE MECHANISM

Earle F. Cox, Chicago Heights, Ill.
(421 S. Ashburton Road, Columbus 13, Ohio)

Filed July 31, 1957, Ser. No. 675,455

2 Claims. (Cl. 74—710.5)

My invention relates to a steering and drive mechanism by which a vehicle can be driven forward or backward with infinite variations of speed and can be turned as gradually or sharply as desired.

In heavy, self-propelled vehicles such as tractors, military vehicles, earth-moving vehicles, and tracked vehicles it is desirable, if not necessary, to provide for steering by control of the rotation of the traction members on each side of the vehicle rather than by pivoting the wheels. The latter method of steering is unsuitable because of the force and clearance required to pivot the wheels, and because the sharpness of the turn is limited. Preferably, pivot turns about an axis through the center of the vehicle should be possible for the necessary maneuvering of this type of vehicle. It is also desirable, because of service to which these vehicles are put, that all traction members of the vehicle drive at all times even when turns are being executed.

With the mechanism of the present invention pivot turns can be executed, as well as gradual turns, and the traction members will drive at all times. Additionally infinite variations of speed can be attained, either forward or backward, and the direction of the vehicle can be reversed without actuation of clutch means. In brief, the traction member or members on one side of the vehicle are driven through a gear train completely independent of the traction members on the other side of the vehicle which are driven through a different gear train. Each of the gear trains are of the type having two spaced gears, each rotatable about a fixed axis, and a third gear meshed with said two gears and movable in an orbit about the periphery of one of said gears, the third gear being rotatable about its own axis. In each of the gear trains one of the gears is driven at a predetermined speed, preferably by direct connection to the engine of the vehicle. Another of the gears of each of the gear trains is driven by a controllable source of power which drives said gear at any desired speed up to a predetermined limit. Each gear train has a separate controllable source of power. The remaining gear of each gear train is connected to the traction member on one side of the vehicle.

As the two gears of each gear train are driven, the third gear is driven to drive the traction members at a velocity dependent on the relative velocity at which the two gears are driven. Since one of these gears is driven at a predetermined speed, the velocity of the traction members is dependent on the velocity at which the other gear is driven, and with the controllable source of power, this gear can be driven at varying velocities to drive the traction member either forwardly or rearwardly at varying speeds. Since each gear train has a separate source of controllable power the traction members on both sides can be driven at different speeds for turning, or one can be driven forwardly and the other rearwardly for pivoting, or both can be driven forwardly at the same speed for straight forward drive, or both can be driven rearwardly at the same speed for straight rearward drive. It should be noted that the vehicle can be turned without speeding up the outside traction member, an important factor contributing to the stabilization of the vehicle while turning.

It is therefore a general object of the present invention to provide a drive and steering mechanism operable to pivot or turn the vehicle or drive the vehicle forwardly or rearwardly with infinite speed variations.

It is another object of the present invention to provide a drive mechanism in which all traction members drive when the vehicle is driven straight or turning.

It is still another object of the present invention to provide a drive mechanism operable to change the direction of travel of the vehicle without actuation of clutch means.

It is yet another object of the present invention to provide a drive mechanism operable to drive the vehicle forwardly or rearwardly with infinite variations in speed and operable to drive the vehicle at a predetermined speed in one direction with direct drive from the engine.

It is an additional object of the present invention to provide a drive mechanism operable to drive the traction members on each side of a vehicle independent of the traction members on the opposite side of the vehicle.

It is a further object of the present invention to provide a drive mechanism by which the traction members on opposite sides of the vehicle can be driven in opposite directions to pivot the vehicle.

It is yet another object of the present invention to provide a simple, inexpensive drive and steering mechanism for a vehicle which is easy to operate, and versatile and efficient in its operation.

The novel features which I believe to be characteristic of my invention are set forth with particularity in the appended claims. My invention itself, however, both as to its organization and method of operation, together with further objects and advantages thereof will be best understood by reference to the following description taken in conjunction with the accompanying drawings in which:

Figure 8:
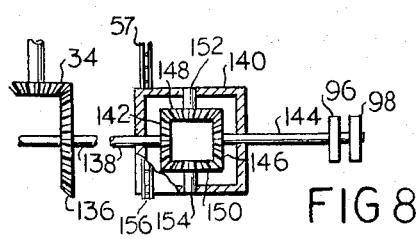
Figure 3:
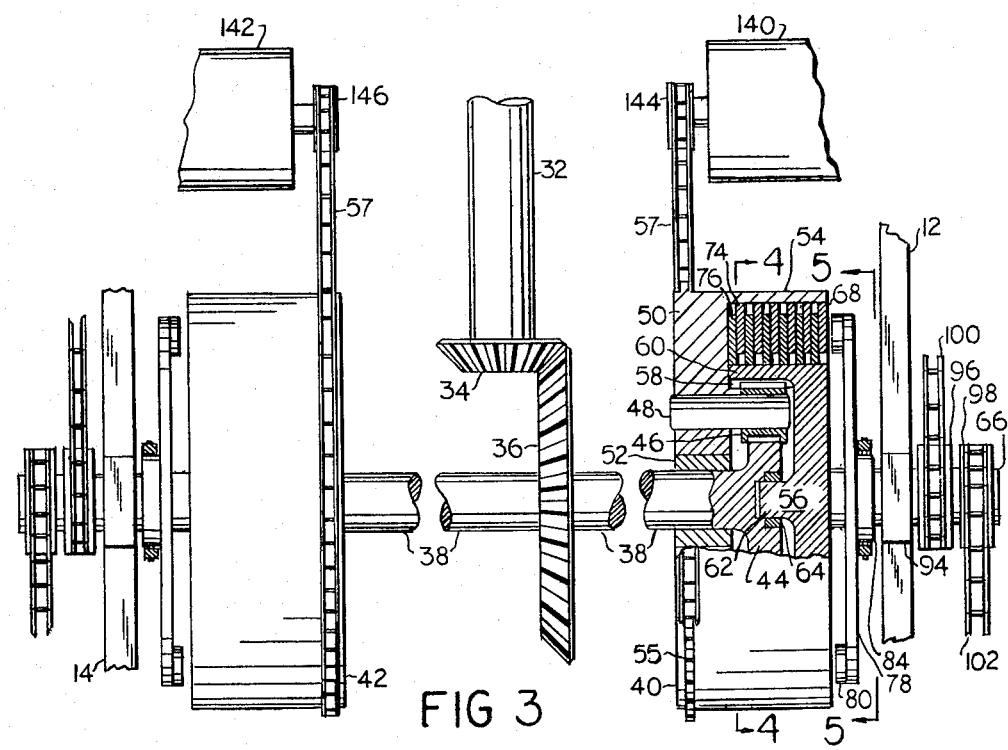
Figure 3 is an enlarged top plan view, having parts broken away for clarity, of portions of the drive and steering mechanism.

Figures 7a, 7b, 7c, 7d, 7e, and 7f, are schematic diagrams of the planetary gear train of Figure 3 during the various stages of operation of said gear train; and Figure 8 is a top plan view of another form of gear train of the present invention.

Figure 1:
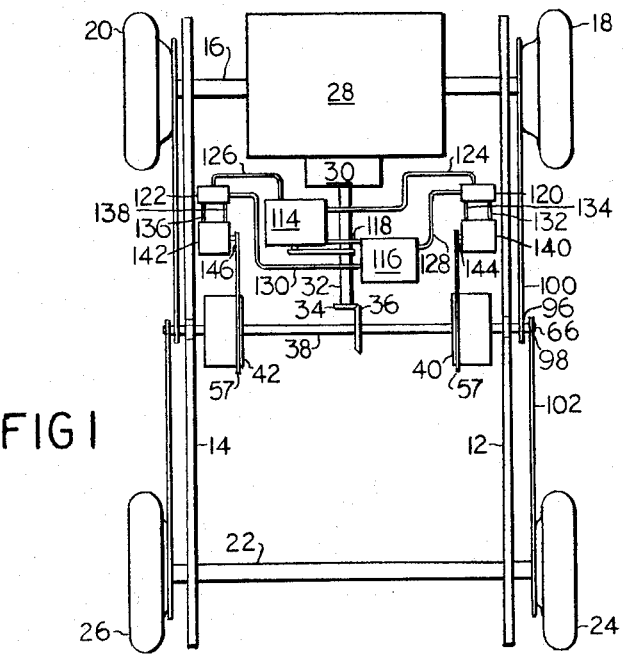
Figure 1 is a top plan view in diagrammatic form showing the mechanism of the present invention installed on a four-wheeled vehicle.
Figure 2:
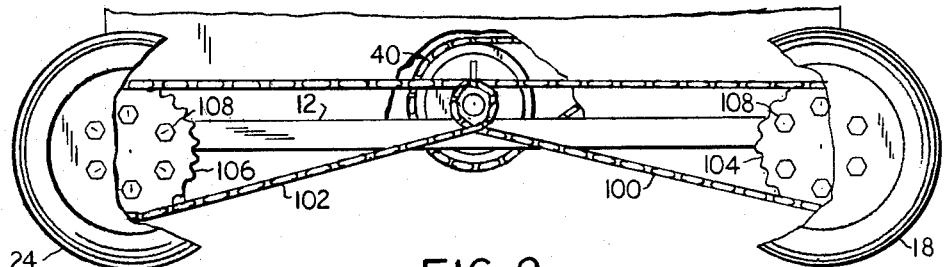
Figure 2 is a side elevational view of the vehicle of Figure 1.

In Figures 1 and 2 there is shown a self-propelled vehicle having a frame with two longitudinal frame members 12 and 14. The frame has securely connected thereto a front axle 16 which carries front wheels 18 and 20 at each end, respectively, outboard of the longitudinal frame members, defining traction members on each side of the vehicle. The frame has a rear axle 22, also rigidly secured thereto, which carries the rear wheels 24 and 26 constituting traction members outboard the respective longitudinal frame members. The frame also may have transverse members (not shown) to support flooring, the engine, and the drive and steering mechanism hereinafter described.

The engine 28 of the vehicle defines motive means which drives a rearwardly extending drive shaft 32 through the transmission 30. The rear end of the drive shaft 32 has a bevel drive pinion 34, connected fast thereto, which meshes with the bevel ring gear 36. The bevel ring gear 36 is connected fast to the transverse shaft 38.

Figure 4:
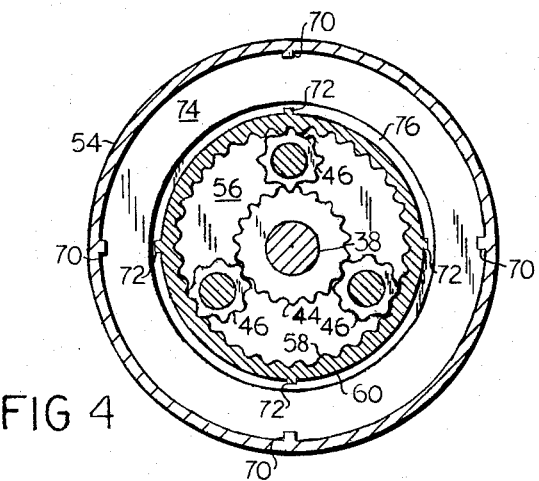
Figure 4 is a view through section 4—4 of Figure 3.

The shaft 38 extends transversely between the gear trains 40 and 42 located, respectively, on each side of the vehicle. As shown in Figure 3, the shaft 38 carries at each outboard end a sun gear 44 integral with said shaft. As shown in Figures 3 and 4, the sun gear 44 is meshed with a plurality of planetary gears 46 which are rotatably mounted on pins 48. The pins 48 are secured fast in a planetary gear rotor 50. The rotor 50 has a central opening receiving a bearing 52 which is rotatably mounted on the transverse shaft 38 so that the rotor 50 is carried on and rotates in relation to that shaft. At its outer periphery the rotor 50 has a flange 54 extending outboard therefrom. The planetary gear rotor 50 has sprocket teeth 55 extending about its circumference which receives a sprocket chain 57.

An internal gear 56 has a flange 60 extending inboard from its outer periphery. The flange 60 has internal gear teeth 58 cut on its inside surface. The internal gear has a hub portion 62 which is rotatably received in a bearing 64 carried fast in the sun gear 44.

The circumference of the internal gear 56 is less than the planetary gear rotor 50 so that the respective flanges of the rotor and the internal gear define an annular cavity 68. Circumferentially spaced ribs 70 extend inwardly from the inner surface of the rotor flange 54 and circumferentially spaced ribs 72 extend outwardly from the outer surface of the internal gear flange 60, as shown in Figure 4. Annular clutch discs 74 and 76 are interleaved and received within the annular cavity 68. The discs 74 have notches in their outer peripheries which engage with the ribs 70 to hold the discs non-rotatable in relation to the rotor flange 54. The inner peripheries of the annular discs 74 are outboard of the ribs 72. The annular discs 76 are smaller in circumference than the discs 74 and have notches on their inner peripheries which engage the ribs 72 of the internal gear. This holds the discs 76 non-rotatable in relation to the internal gear. The outer peripheries of the annular discs 76 lie inboard of the ribs 70 on the rotor flange. With this construction the discs 74 are non-rotatable in relation to the rotor flange 54 while the discs 76 are non-rotatable with relation to the internal gear. The discs, however, are movable axially in relation to each other and when no pressure is exerted thereon are free to rotate in relation to each other.

A shaft 66 is connected fast to the internal gear 56 to extend outboard from that gear in colinear relationship with the shaft 38. The shaft 66 is received in a bearing block 94 carried on the longitudinal frame member 12. Outboard of the bearing block 94 the shaft 66 receives a pair of sprocket gears 96 and 98 connected fast thereto. The sprockets 96 and 98 receive, respectively, chains 100 and 102. The chain 100, as shown in Figure 2, extends forwardly and drives the sprocket 104 which is connected by bolts 108 to the right front wheel 18 of the vehicle. The chain 102 extends rearwardly and connects to sprocket 106 which is connected by bolts 108 to the rear right wheel 24.

Figure 5:
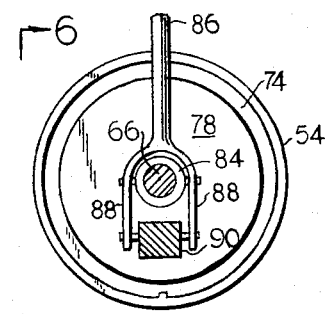
Figure 5 is a view through section 5—5 of Figure 3.
Figure 6:
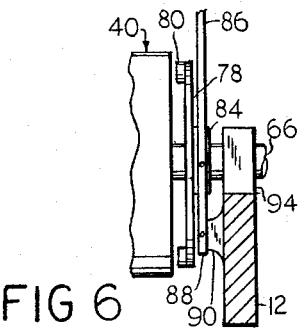
Figure 6 is a view through section 6—6 of Figure 5.

A clutch actuating plate 78 having a hub 84 is carried loosely on the shaft 66 immediately outboard of the gear train 40. At its outer margin the clutch plate 78 has discs 80 which are aligned with the clutch discs 74 and 76. As shown in Figures 5 and 6 the clutch plate is actuated by a clutch lever 86 which has a pair of forked arms 88 straddling the hub 84 and which is pivotally connected thereto. The arms 88 extend beyond the hub 84 and are pivotally connected at their ends to a lug 90 connected to the inner surface of the longitudinal frame member 12.

The gear train 42, which is also connected to the transverse shaft 38, is similar to the gear train 40 but opposed in its construction. The gear train 42 is connected by sprocket chains to the front and rear left hand wheels of the vehicle in the same manner as gear train 40.

As shown in Figure 1, a hydraulic pump 114, which may be driven, as shown, by the driveshaft 32, receives fluid from a sump 116 through pipe 118. The pump 114 supplies a continuous flow of fluid to the control valves 120 and 122 through pipes 124 and 126, respectively. From the control-valve 120 the fluid is circulated through the pipe 132, hydraulic motor 140, and the pipe 134 to drive the motor at varying speeds. From the control valve 120 fluid is returned to the sump 116 through pipe 128. Similarly, fluid is circulated from the control valve 122 through pipe 136, motor 142, and pipe 138. Fluid from control valve 122 is returned to the sump 116 through pipe 130. The hydraulic motor shafts carry sprockets 144 and 146 which receive the chains 57 encircling the gear trains 40 and 42.

In the operation of the present invention all desired variations in velocity and direction of travel of the vehicle is achieved through the mechanism above described. No additional steering mechanism is required nor is any reverse drive mechanism in the transmission required. The vehicle is propelled forwardly or rearwardly or in turning action with all four wheels driving at all times. Infinite speed variations either forward or rearwardly can be achieved with the drive shaft rotating at a constant rate and in one direction.

Figures 7A, 7B, 7C, 7D:
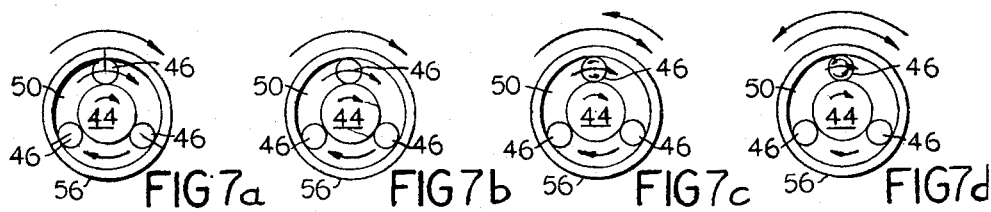

In straight driving, either forwardly or rearwardly both gear trains 40 and 42 are operated at the same speed and to rotate in the same direction. For straight ahead driving, the drive shaft 32 rotates the transverse shaft 38 and hence both the sun gears 44, through the bevel drive pinion 34 and the bevel ring gear 36. This rotation is shown in the diagram of Figure 7a as being clockwise. The clutch mechanism of each gear train is engaged to lock the internal gear 56 with the planetary gear rotor 50 which prevents relative rotation between these two members. Since the planetary gears 46 cannot rotate in relation to the internal gear 56 both gears rotate as a unit with the sun gear 44. This drives the sprockets 96 and 98, which are connected to the internal gear 56, at the same rate and in the same direction as the sun gear 44, and drives the wheels forwardly in direct drive.

It will be noted that if the clutch mechanism of each gear train is disengaged, as shown in Figure 7b, and the planetary gear rotor 50 is driven by the hydraulic motor at the same angular velocity as the sun gear 44, all the gears will rotate in unison just as though they were locked together as in Figure 7a. There will be no relative rotation between the gears and the wheels will be driven as if in direct drive with the clutch engaged.

However, if, as shown in Figure 7c the planetary gear rotor 50 is driven by the hydraulic motor at an angular velocity less than the angular velocity of the sun gear 44 the forward motion of the vehicle will be slowed down. This is because the relative speed of the sun gear 44 and the planetary gear rotor 50 causes the planetary gear to rotate in a counter-clockwise direction. This imparts a counter-clockwise component to the rotation of the internal gear which, however, is less than the clockwise component received from the sun gear 44.

As shown in Figure 7d if the rotation of the planetary gear rotor 50 by the hydraulic motor is reduced still further greater counter-clockwise rotation of the planetary gears result and the counter-clockwise component imparted to the internal gear will equal the clockwise component from the rotation of sun gear 44 so that the internal gear will stop. This, of course, stops the rotation of the sprockets 96 and 98 and stops the rotation of the wheels of the vehicle.

Figures 7E, 7F:
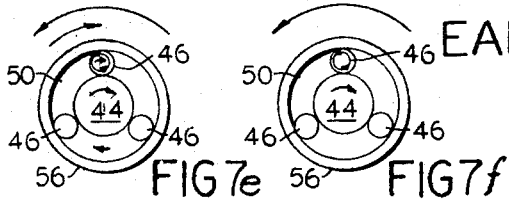

As shown in Figure 7e if the angular velocity of the planetary gear rotor is reduced even further the relative velocity between the sun gear 44 and the rotor 50 causes the planetary gears 46 to rotate in the counter-clockwise direction more rapidly and increases the counter-clockwise component imparted to the internal gear 56. At this time the counter-clockwise component exceeds the clockwise component and the wheels are driven slowly backward.

As shown in Figure 7f when the hydraulic motor is stopped so that the planetary gear rotor is stopped, the planetary gears 46 rotate more rapidly in the counter-clockwise direction and impart that motion to the internal gear 56. Since the rotor 50 is stopped there is no clockwise component acting on the internal gear 56 and the wheels of the vehicle are driven more rapidly in the rearward direction. By properly selecting the relative size of the sun gear, planetary gears, and internal gear, the rearward velocity, when the planetary gear rotor is stopped, can be made to nearly equal the forward velocity when the gear train clutch is engaged. This is desirable to enable the traction members, or wheels, on one side of the vehicle to be driven at about the same speed, but in the opposite direction as the traction members on the opposite side of the vehicle for pivot turning.

The operation of the present invention in straight, forward and backward drive has been described above. In order to turn the vehicle it is only necessary that the wheels on one side of the vehicle be driven at a different rate than the wheels on the other side of the vehicle. This is readily accomplished with the drive mechanism of the present invention since the drive to each side of the vehicle is controlled individually. Turns of any radius can be performed and a pivot turn can be accomplished by driving the wheels on one side of the vehicle forward and the wheels on the other side of the vehicle in reverse at the same rate. It should be noted that all wheels will continue driving while turning.

Another embodiment of the present invention is shown in Figure 8. In this embodiment the transverse shaft 138 has a bevel ring gear 136 carried fast thereon. The bevel ring gear 136 is driven by the bevel drive pinion 34 to rotate the shaft 138. The shaft 138 is loosely received in a differential housing 140 and carries fast on its end within the housing the bevel gear 142. A shaft 144 is loosely received in the housing opposite the shaft 138 and carries fast on its end bevel gear 146 spaced from and parallel to the bevel gear 142. The bevel gears 142 and 146 are connected by two other bevel gears 148 and 150 which are loosely carried on pins 152 and 154, respectively, connected to the differential housing 140. The differential housing has sprocket teeth 156 encircling the housing to receive the chain 57. This chain is driven by the hydraulic motor 140 as in the previous embodiment. The sprockets 96 and 98 which, as in the previous embodiment, are connected by chains to the wheels on one side of the vehicle, are carried fast on the end of shaft 144.

In operation the shaft 138 is rotated to rotate the bevel gear 142. For full forward speed the differential housing 140 is rotated by the hydraulic motor at the same angular velocity as the bevel gear 142 to drive the bevel gear 146 and the shaft 144, and hence the wheels, at the same angular velocity and in the same direction as the shaft 138. When the differential housing 140 is driven at a slower angular velocity than the shaft 138, and hence slower than the bevel gear 142, the bevel gears 148 and 150 rotate on their pins and impart a component of velocity to the bevel gear 146, and hence the shaft 144 and the wheels, opposed to the component imparted by the shaft 138. This reduces the forward speed of the vehicle. As the angular velocity of the differential housing 140 is further reduced the rotation of the bevel gears 148 and 150 is increased until the forward component of angular velocity is off-set by the rearward component and the wheels stop. As the angular velocity of the housing is further decreased the rotation of the bevel gears 148 and 150 increase and the vehicle moves slowly rearwardly. When the angular rotation of the differential housing is stopped the wheels are driven rearwardly at maximum velocity.

While I have shown and described specific embodiments of the present invention it will, of course, be understood that various modifications and alternative construction may be made without departing from the true spirit and scope of the invention. I therefore intend by the appended claims to cover all such modifications and alternative constructions as fall within their true spirit and scope.

What I claim and desire to secure by United States Letters Patent is:

1. A drive and steering mechanism to control individually the respective traction means on each side of a self-propelled vehicle having power means comprising in combination: a pair of differential gear means connected to said power means, each of said gear means being connected to a traction means, respectively; hydraulic pump means connected to said power means to supply hydraulic fluid under pressure; a pair of hydraulic motors connected to said gear means respectively; hydraulic control means connected to said pump means and to said motors to actuate said motors, said control means being variable to control the output of said motors, respectively; each of said gear means including a sun gear member, a planetary gear, a ring gear member, a planetary gear mounting member to rotationally support said planetary gear, each of said members being rotatable about a common axis, one of said members being connected to said power means for rotation therewith, a second of said members being connected to the respective traction means for rotation therewith, the third of the members connected to the respective hydraulic motor for rotation therewith whereby said hydraulic control means may be utilized to control the rotation of the third member which in turn will control the rotation of the respective traction means independently of the rotation of the other traction means; and a clutch means for each of said gear means, each of said clutch means interconnecting two of said members of each of said gear means whereby by engaging said clutch said two members will rotate in unison and said power means will be directly connected to said traction means.

2. A drive and steering mechanism to control individually the respective traction means on each side of a self-propelled vehicle having power means comprising in combination; a pair of differential gear means connected to said power means, each of said gear means being connected to a traction means, respectively; hydraulic pump means connected to said power means to supply hydraulic fluid under pressure; a pair of hydraulic motors connected to said gear means respectively; hydraulic control means connected to said pump means and to said motors to actuate said motors, said control means being variable to control the output of said motors, respectively; each of said gear means including a sun gear, a planetary gear, a planetary gear rotor, and a ring gear, said planetary gear rotor, said sun gear and said ring gear being mounted for rotation about a common axis, said platentary gear being rotatably mounted on said rotor and meshing with said sun and ring gears, said sun gear being connected to said power means to rotate therewith, said ring gear being connected to said traction means to rotate therewith, said rotor being connected to the respective hydraulic motor to rotate therewith, whereby said hydraulic control means may be utilized to control the rotation of the respective rotor which in turn will control the rotation of the respective traction means independent of the rotation of the other traction means; and a clutch means for each of gear means, each of said clutch means interconnecting the ring gear and the rotor of the respective gear means whereby by engaging said clutch means said ring gear and rotor will rotate in unison and said power means will be directly connected to said traction means.

References Cited in the file of this patent

UNITED STATES PATENTS

| | | |
|---|---|---|
| 1,413,414 | McDaniels | Apr. 18, 1922 |
| 1,984,830 | Higley | Dec. 18, 1934 |
| 2,197,248 | Bonham et al. | Apr. 16, 1940 |
| 2,209,641 | Weber | July 30, 1940 |
| 2,336,912 | Zimmermann | Dec. 14, 1943 |
| 2,390,240 | De Lancey | Dec. 4, 1945 |
| 2,568,007 | Jandasek | Sept. 18, 1951 |
| 2,580,946 | Orshansky et al. | Jan. 1, 1952 |